United States Patent
Gao

(10) Patent No.: US 11,568,868 B2
(45) Date of Patent: Jan. 31, 2023

(54) VOICE CONTROL METHOD AND APPARATUS, AND COMPUTER STORAGE MEDIUM

(71) Applicant: Beijing Xiaomi Pinecone Electronics Co., Ltd., Beijing (CN)

(72) Inventor: Chizhen Gao, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 228 days.

(21) Appl. No.: 17/067,981

(22) Filed: Oct. 12, 2020

(65) Prior Publication Data
US 2021/0375281 A1    Dec. 2, 2021

(30) Foreign Application Priority Data

May 29, 2020   (CN) .......................... 202010476419.X

(51) Int. Cl.
| | |
|---|---|
| *G10L 15/22* | (2006.01) |
| *G10L 15/08* | (2006.01) |
| *H04L 12/12* | (2006.01) |
| *H04L 12/28* | (2006.01) |

(52) U.S. Cl.
CPC .......... *G10L 15/22* (2013.01); *G10L 15/083* (2013.01); *H04L 12/12* (2013.01); *H04L 12/2803* (2013.01); *G10L 2015/223* (2013.01)

(58) Field of Classification Search
CPC . G10L 15/22; G10L 15/083; G10L 2015/223; H04L 12/12
USPC ....................................................... 704/201
See application file for complete search history.

(56) References Cited

U.S. PATENT DOCUMENTS

| | | | | |
|---|---|---|---|---|
| 10,482,904 | B1 * | 11/2019 | Hardie | ................. G10L 15/22 |
| 10,546,583 | B2 * | 1/2020 | White | ................. G10L 15/28 |
| 10,650,816 | B2 * | 5/2020 | Lee | ............... H04N 21/42203 |
| 10,685,652 | B1 * | 6/2020 | Cherukuri | ............... G10L 25/51 |
| 10,685,669 | B1 * | 6/2020 | Lan | ................. G10L 15/1822 |
| 10,735,597 | B1 * | 8/2020 | Zagorski | ............... H04M 3/567 |
| 10,964,327 | B2 * | 3/2021 | Lee | .................. G10L 15/1822 |

(Continued)

FOREIGN PATENT DOCUMENTS

| CN | 110322878 A | 10/2019 |
|---|---|---|
| CN | 111091828 A | 5/2020 |

OTHER PUBLICATIONS

Extended European Search Report (EESR) for EP application 20216974.4 dated Jun. 16, 2021.

*Primary Examiner* — Susan I McFadden
(74) *Attorney, Agent, or Firm* — Syncoda LLC; Feng Ma

(57) ABSTRACT

A voice control method can be applied to a first terminal, and include: receiving a user's voice operation instruction after the first terminal is activated, the voice operation instruction being used for controlling the first terminal to perform a target operation; sending an instruction execution request to a server after the voice operation instruction is received, the instruction execution request being used for requesting the server to determine whether the first terminal is to respond to the voice operation instruction according to device information of the terminal in a device network, wherein the first terminal is located in the device network; and performing the target operation in a case where a response message is received from the server, the response message indicating that the first terminal is to respond to the voice operation instruction.

15 Claims, 5 Drawing Sheets

FIG. 4

(56) References Cited

U.S. PATENT DOCUMENTS

| | | | |
|---|---|---|---|
| 11,355,107 B2* | 6/2022 | Cheng | ................. G10L 15/22 |
| 2018/0247645 A1 | 8/2018 | Li et al. | |
| 2019/0341048 A1 | 11/2019 | Cheng et al. | |

* cited by examiner

VOICE CONTROL METHOD AND APPARATUS, AND COMPUTER STORAGE MEDIUM

CROSS-REFERENCE TO RELATED APPLICATION

This application claims priority to Chinese Patent Application No. 202010476419.X filed on May 29, 2020, the disclosure of which is hereby incorporated by reference in its entirety.

BACKGROUND

Smart terminal devices are becoming more popular with the development of computer technologies. For example, in a smart-home scenario where there may be a plurality of smart terminal devices, such as an alarm clock, a TV, a speaker, etc., a smart terminal device may be activated by the user via voice and be controlled to execute corresponding operations.

SUMMARY

The present disclosure relates generally to computer technologies, and more specifically to a voice control method and apparatus, and a computer storage medium.

According to a first aspect of the embodiment of the present disclosure, a voice control method applied to a first terminal is provided, the method including: receiving a user's voice operation instruction after the first terminal is activated, the voice operation instruction being used for controlling the first terminal to perform a target operation; sending an instruction execution request to a server after the voice operation instruction is received, the instruction execution request being used for requesting the server to determine whether the first terminal is to respond to the voice operation instruction according to device information of the terminal in a device network, wherein the first terminal is located in the device network; and performing the target operation in a case where a response message is received from the server, the response message indicating that the first terminal is to respond to the voice operation instruction.

Alternatively, the method further includes: determining, in a case where a wake-up signal is detected, a first wake-up signal characteristic information according to the detected wake-up signal; receiving a second wake-up signal characteristic information sent from a second terminal in the device network, wherein the second wake-up signal characteristic information is determined by the second terminal according to the wake-up signal detected by itself, and the second terminal is any terminal that has detected the wake-up signal among the terminals in the device network other than the first terminal; determining whether the first terminal needs to be activated according to the first wake-up signal characteristic information and the second wake-up signal characteristic information; controlling the first terminal to be activated in a case where it is determined that the first terminal needs to be activated.

Alternatively, the second wake-up signal characteristic information sent from the second terminal in the device network is received during a first decision period, and determining whether the first terminal needs to be activated according to the first wake-up signal characteristic information and the second wake-up signal characteristic information includes: determining whether the first terminal needs to be activated according to the first wake-up signal characteristic information and according to the second wake-up signal characteristic information received during the first decision period.

Alternatively, determining whether the first terminal needs to be activated according to the first wake-up signal characteristic information and according to the second wake-up signal characteristic information received during the first decision period, includes: determining a terminal wake-up parameter corresponding to the first terminal according to the first wake-up signal characteristic information; determining a terminal wake-up parameter corresponding to each second terminal according to each second wake-up signal characteristic information respectively, wherein the terminal wake-up parameter is configured for characterizing a matching degree between the terminal and the wake-up signal; and determining that the first terminal needs to be activated in a case where the terminal corresponding to the best matching terminal wake-up parameter is the first terminal.

Alternatively, the method further includes: sending the first wake-up signal characteristic information to the server, so that the server determines whether the first terminal is to respond to the voice operation instruction according to the first wake-up signal characteristic information and the device information of the terminal in the device network, after the instruction execution request is received.

Alternatively, the wake-up signal characteristic information includes at least one of the following: a direction of sound source, a distance of sound source, a signal energy, and a matching degree between a wake-up signal and a wake-up word.

According to a second aspect of the embodiment of the present disclosure, a voice control method applied to a server is provided, the method including: determining, in a case where instruction execution requests sent from a plurality of terminals are received during a second decision period, a target terminal for responding to a voice operation instruction corresponding to the instruction execution requests among the plurality of terminals according to device information of each of the terminals, wherein the plurality of terminals are located in the same device network, and the instruction execution requests sent from the plurality of terminals correspond to the same voice operation instruction; and sending a response message to the target terminal for indicating that the target terminal is to respond to the voice operation instruction, so that the target terminal performs a target operation corresponding to the voice operation instruction.

Alternatively, the method further includes: sending a denial message to terminals among the plurality of terminals other than the target terminal, the denial message indicating that the terminals are to refuse to respond to the voice operation instruction.

Alternatively, the method further includes: receiving wake-up signal characteristic information sent from the plurality of terminals during the second decision period, the wake-up signal characteristic information being determined by the terminal according to a wake-up signal detected by itself, and determining a target terminal for responding to a voice operation instruction corresponding to the instruction execution requests among the plurality of terminals according to device information of each of the terminals, includes: determining priority information for each of the terminals according to the wake-up signal characteristic information sent from each of the terminals; and determining the target terminal according to the voice operation instruction, the priority information for each of the terminals, and the device information for each of the terminals.

Alternatively, the device information includes device capability information for characterizing operations supported by the terminal, and determining the target terminal according to the voice operation instruction, the priority information for each of the terminals, and the device information for each of the terminals, includes: determining a terminal having the highest priority among the terminals with the device capability information matching with the target operation corresponding to the voice operation instruction, as the target terminal.

Alternatively, the wake-up signal characteristic information includes at least one of the following: a direction of sound source, a distance of sound source, a signal energy, and a matching degree between a wake-up signal and a wake-up word.

According to a third aspect of the embodiment of the present disclosure, a voice control apparatus applied to a first terminal is provided, the apparatus including: a first receiving component, configured to receive a user's voice operation instruction after the first terminal is activated, the voice operation instruction being used for controlling the first terminal to perform a target operation; a first sending component, configured to send an instruction execution request to a server after the voice operation instruction is received, the instruction execution request being used for requesting the server to determine whether the first terminal is to respond to the voice operation instruction according to device information of the terminal in a device network, wherein the first terminal is located in the device network; and a performing component, configured to perform the target operation in a case where a response message is received from the server, the response message indicating that the first terminal is to respond to the voice operation instruction.

Alternatively, the apparatus further includes: a first determining circuit, configured to determine a first wake-up signal characteristic information according to the detected wake-up signal in a case where a wake-up signal is detected; a second receiving component, configured to receive a second wake-up signal characteristic information sent from a second terminal in the device network, wherein the second wake-up signal characteristic information is determined by the second terminal according to the wake-up signal detected by itself, and the second terminal is any one of the terminals other than the first terminal in the device network that detect the wake-up signal; a second determining circuit, configured to determine whether the first terminal needs to be activated according to the first wake-up signal characteristic information and the second wake-up signal characteristic information; and a controlling module, configured to control the first terminal to be activated in a case where it is determined that the first terminal needs to be activated.

Alternatively, the second wake-up signal characteristic information sent from the second terminal in the device network is received during a first decision period, and the second determining circuit includes: a first determining sub-module, configured to determine whether the first terminal needs to be activated according to the first wake-up signal characteristic information and the second wake-up signal characteristic information received during the first decision period.

Alternatively, the first determining sub-module includes: a second determining sub-module, configured to determine a terminal wake-up parameter corresponding to the first terminal according to the first wake-up signal characteristic information; a third determining sub-module, configured to determine each terminal wake-up parameter corresponding to the second terminal according to each second wake-up signal characteristic information respectively, wherein the terminal wake-up parameter is configured for characterizing a matching degree between the terminal and the wake-up signal; and a fourth determining sub-module, configured to determine that the first terminal needs to be activated in a case where the best matching terminal corresponding to the terminal wake-up parameter is the first terminal.

Alternatively, the apparatus further includes: a second sending component, configured to send the first wake-up signal characteristic information to the server, so that the server determines whether the first terminal responds to the voice operation instruction according to the first wake-up signal characteristic information and the device information of the terminal in the device network, after the instruction execution request is received.

Alternatively, the wake-up signal characteristic information includes at least one of the following: a direction of sound source, a distance of sound source, a signal energy, and a matching degree between a wake-up signal and a wake-up word.

According to a fourth aspect of the embodiment of the present disclosure, a voice control apparatus applied to a server is provided, the apparatus including: a third determining circuit, configured to determine a target terminal for responding to a voice operation instruction corresponding to instruction execution requests from a plurality of terminals according to device information of each terminal, in a case where the instruction execution requests sent from a plurality of terminals are received during a second decision period, wherein the plurality of terminals are located in the same device network, and the instruction execution requests sent from the plurality of terminals correspond to the same voice operation instruction; and a third sending component, configured to send a response message for indicating that the first terminal responds to the voice operation instruction to the target terminal, so that the target terminal executes the target operation corresponding to the voice operation instruction.

Alternatively, the apparatus further includes: a fourth sending component, configured to send a denial message for indicating the other terminals reject responses to the voice operation instruction, to other terminals among the plurality of terminals other than the target terminal.

Alternatively, the apparatus further includes: a third receiving component, configured to receive wake-up signal characteristic information sent from the plurality of terminals during the second decision period, wherein the wake-up signal characteristic information is determined by the terminal according to its detected wake-up signal; the third determining circuit includes: a fifth determining sub-module, configured to determine priority information of each terminal according to the wake-up signal characteristic information sent from each terminal; and a sixth determining sub-module, configured to determine the target terminal according to the voice operation instruction, the priority information of each terminal and the device information of each terminal.

Alternatively, the device information includes device capability information for characterizing the operations supported by the terminal; the sixth determining sub-module includes: a seventh determining sub-module, configured to determine a terminal with the highest priority among the terminals whose device capability information match the target operation corresponding to the voice operation instruction as the target terminal.

Alternatively, the wake-up signal characteristic information includes at least one of the following: a direction of sound source, a distance of sound source, a signal energy, and a matching degree between a wake-up signal and a wake-up word.

According to a fifth aspect of the embodiment of the present disclosure, a voice control apparatus applied to a first terminal is provided, including: a processor; a memory configured to store instructions executable by the processor; wherein the processor is configured to: receive a user's voice operation instruction for controlling the first terminal to perform a target operation after the first terminal is activated; send to a server an instruction execution request for determining by the server whether the first terminal responds to the voice operation instruction according to device information of the terminal in a device network after the voice operation instruction is received, wherein the first terminal is located in the device network; and execute the target operation in a case where a response message for indicating that the first terminal responds to the voice operation instruction sent from the server is received.

According to a sixth aspect of the embodiment of the present disclosure, a voice control apparatus applied to a server is provided, including: a processor; a memory configured to store instructions executable by the processor; wherein the processor is configured to: determine a target terminal for responding to a voice operation instruction corresponding to instruction execution requests from a plurality of terminals according to device information of each terminal, in a case where the instruction execution requests sent from a plurality of terminals are received during a second decision period, wherein the plurality of terminals are located in the same device network, and the instruction execution requests sent from the plurality of terminals correspond to the same voice operation instruction; and send a response message for indicating that the first terminal responds to the voice operation instruction to the target terminal, so that the target terminal executes the target operation corresponding to the voice operation instruction.

According to a seventh aspect of the embodiment of the present disclosure, a computer-readable storage medium is provided, having computer program instructions stored thereon which, when are executed by a processor, implement the steps of the method according to the first or second aspect of the present disclosure.

It should be understood that the above general description and the following detailed description are only exemplary and explanatory, without any limitation to the present disclosure.

BRIEF DESCRIPTION OF THE DRAWINGS

The drawings herein are incorporated into the disclosure and constitute a part of the disclosure, which illustrate the embodiments that conform to the present disclosure and are used to explain the principle of the present disclosure together with the specification.

DETAILED DESCRIPTION

Example embodiments will be explained in detail here, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with some aspects related to the present disclosure as detailed in the appended claims.

In some scenarios, after the user sends a voice operation instruction in a multi-terminal environment, a plurality of smart devices may be activated to execute the operation corresponding to the voice operation instruction. For example, when the user wants to play music, the speaker and the TV may be activated at the same time, so that both of them play music at the same time, adversely affecting the user experience.

That is, when a plurality of smart terminal devices may be simultaneously activated by one voice operation instruction of the user, the plurality of terminal devices may execute the operation at the same time and thus causes inconvenience to the user during the usage of terminals.

Figure 1:
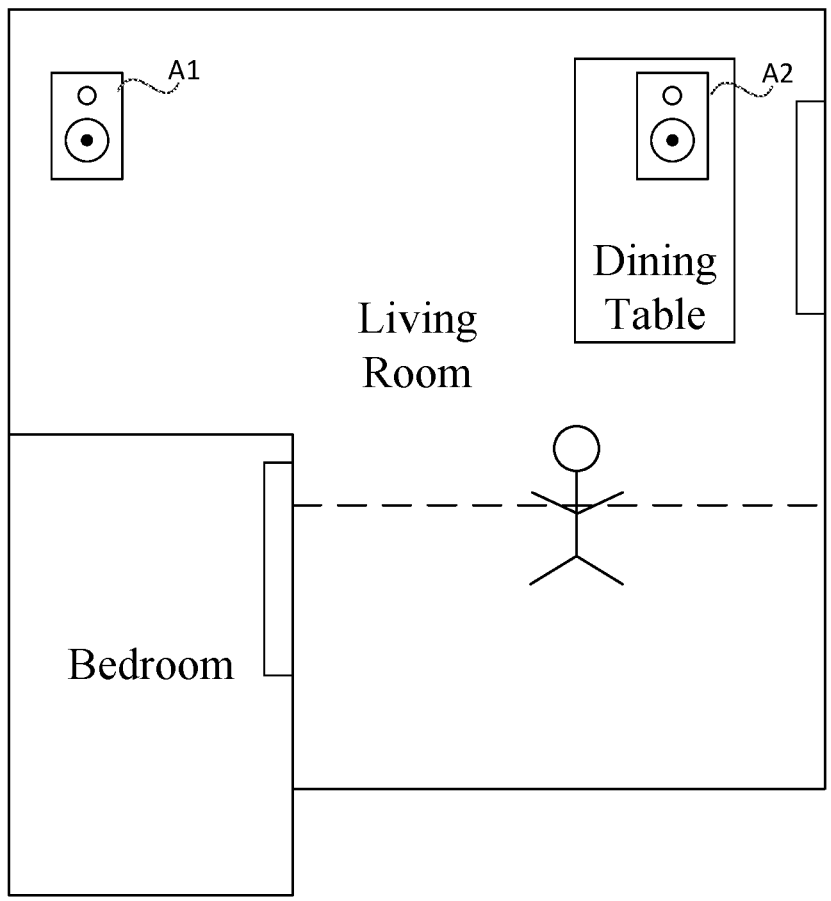
FIG. 1 is an example usage scenario diagram.

In an example as illustrated in FIG. 1 there are two smart terminals A1 and A2 in the living room for example, where the terminal A1 is a TV and the terminal A2 is a speaker. In a case where the TV and the speaker are both activated, answers from the TV and the speaker will be received if the user makes a voice inquiry of "what's the weather today", and they may be interfered with each other. If the user instructs to play music, the user also needs to manually close one of them so as to clearly hear the played music when the two play music at the same time.

Various embodiments of the present disclosure can solve these and similar problems.

Figure 2:
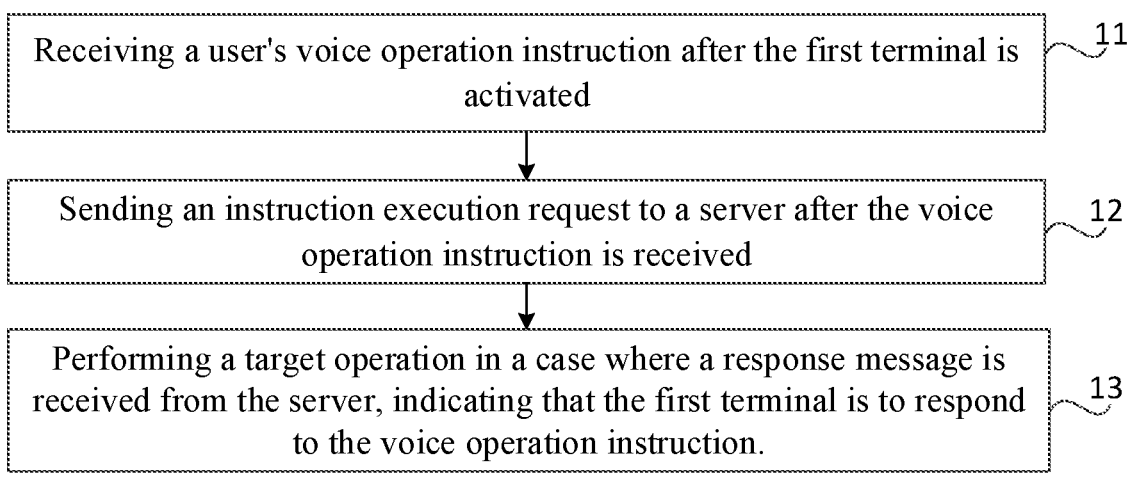
FIG. 2 is a flowchart of a voice control method illustrated according to some embodiments.

FIG. 2 is a flowchart of a voice control method illustrated according to some embodiments. As illustrated in FIG. 2, the voice control method may be used for the first terminal, including the following steps:

At step 11, a user's voice operation instruction is received after the first terminal is activated, the voice operation instruction being used for controlling the first terminal to perform a target operation.

For example, the first terminal may be any terminal in the current environment. After the first terminal is activated, it may always detect the voice data in the located environment, so as to determine the voice operation instruction from the user.

At step 12, an instruction execution request is sent to the server after the voice operation instruction is received. The instruction execution request is used for requesting the server to determine whether the first terminal is to respond to the voice operation instruction according to device information of the terminal in a device network, wherein the first terminal is located in the device network.

The device network may be preset. For example, the device information of the device may include but is not limited to at least one of the following: a device identifier for uniquely identifying the device; device capability information for characterizing the operation supported by the device; a device model for identifying the type of the device; a wake-up engine identifier for identifying the wake-up engine used by the device; user information for representing the information such as a user account and a user type logged in the device.

The process of determining the device network is explained in detail below. In one possible implementation, device information of the first terminal may be released through the local communication network after the first terminal is started. For example, broadcast or multicast may be used for release. For example, the local communication network may be Wi-Fi, Bluetooth, or ZigBee, which is not limited by the present disclosure.

As an example, the device information of the first terminal may be sent to all possible receivers in the network if it is released in a broadcast method. The device information of the first terminal may be sent to each terminal of the group to which the first terminal belongs in the network, if it is released in a multicast method. The method of releasing messages through broadcast and multicast belong to the prior art, and will not be repeated again herein.

Therefore, after the device information of the first terminal is released and when other terminals receive the device information, it may be determined according to the construction rule of the device network that whether the device information satisfies the construction rule. For example, a plurality of terminals located in the same local area network may be added to the same device network, such as the terminals A1 and A2 connected to the same WiFi as illustrated in FIG. 1; or the terminals corresponding to the same user information may be added to the same device network; or the terminals located in the same local area network and corresponding to the same user information may be added to the same device network.

Take adding the terminal corresponding to the same user information to the same device network as an example, after the device information of other devices are received, the further device is added to the device network where the first terminal is located if the user information in the device information of this further device is the same as that the user information of the first terminal; the device information may be directly ignored if the user information in this device information is different from the user information of the first terminal. In this way, each terminal belonging to the same device network may be determined. Among them, the foregoing is only an example description for determining the terminal in the device network, but does not limit the present disclosure, which may be set according to actual usage scenarios.

At this step, after the first terminal receives the voice operation instruction, an instruction execution request is sent to the server instead of directly executing a target operation corresponding to the voice operation instruction, so that the server determines whether the first terminal responds to the received voice operation instruction according to the relevant information of the terminal in the device network.

At step 13, the target operation is performed in a case where a response message is received from the server, the response message indicating that the first terminal is to respond to the voice operation instruction.

In the above technical solution, after the first terminal is activated, a user's voice operation instruction is received and an instruction execution request is sent to a server, so that the server determines whether the first terminal responds to the voice operation instruction according to the information of the terminal in the device network where the first terminal is located. Thereby, the target operation corresponding to the voice operation instruction is executed in a case where a response message for indicating that the first terminal responds to the voice operation instruction is sent from the server is received.

Therefore, in the above technical solution, after the activated terminal receives a voice operation instruction, it does not directly respond to the voice operation instruction but the server assists in determining whether this terminal should make responses, which thereby effectively avoids the problem that a plurality of terminals execute the same operation at the same time due to the terminal's direct responses to the voice operation instruction, and provides technical support to ensure the unique execution of the target operation. In addition, in the embodiment of the present disclosure, since the server decides whether the terminal should make responses to the received voice operation instruction, only the server may be upgraded when the voice control service is upgraded while each terminal is unaware, which reduces the overhead of the service version upgrade and broadens the usage scope of the voice control method.

Figure 3:
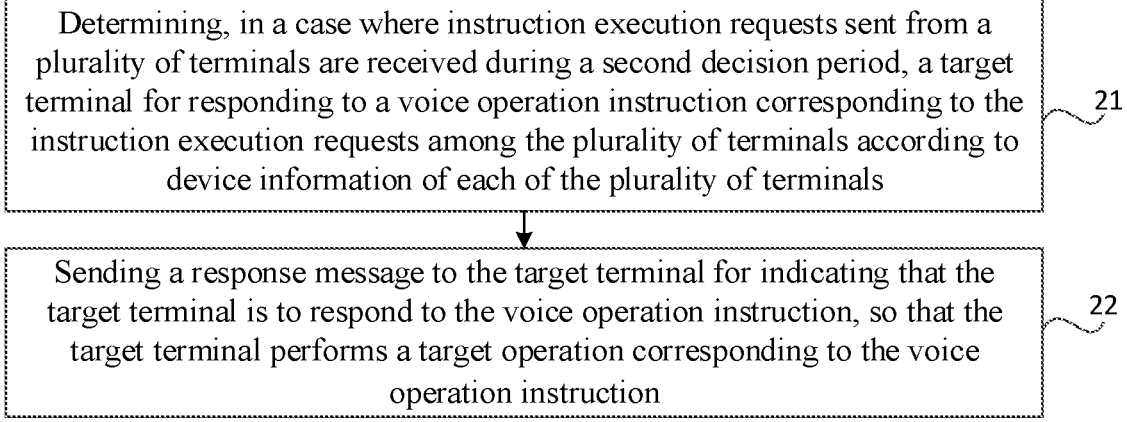
FIG. 3 is a flowchart of a voice control method illustrated according to some other embodiments.

Correspondingly, the present disclosure also provides a voice control method, which is applied to a server. For example, the server may be a cloud server. As illustrated in FIG. 3, it is a flowchart of a voice control method according to an embodiment of the present disclosure, the method including the following steps:

At step 21, in a case where instruction execution requests sent from a plurality of terminals are received during a second decision period, a target terminal for responding to a voice operation instruction corresponding to the instruction execution requests is determined among the plurality of terminals according to device information of each of the terminal, wherein the plurality of terminals are located in the same device network, and the instruction execution requests sent from the plurality of terminals correspond to the same voice operation instruction.

The method for determining the device network is the same as that described above, and will not be repeated again herein. For example, when each terminal is started, it may send its own device information to the server, so that the server may store the device information and determine the terminals belonging to the same device network according to the device information sent from each terminal.

At this step, the server receives the instruction execution requests sent from a plurality of terminals corresponding to the same voice operation instruction (i.e., a plurality of terminals in a device network are in an awake state and they all detect the voice operation instruction sent from the user), at this time, the server determines a target terminal that responds to the voice operation instruction from the plurality of terminals, where there is one target terminal. In particular, the method for determining the target terminal is described in detail below.

At step 22, a response message for indicating that the target terminal is to respond to the voice operation instruction is sent to the target terminal, so that the target terminal performs a target operation corresponding to the voice operation instruction.

In the above technical solution, the server may determine the target terminal for responding to the voice operation instruction from the plurality of terminals when the instruction execution requests sent from a plurality of terminals corresponding to the same voice operation instruction are received, so that the target terminal sends a response message and then executes the target operation corresponding to the voice operation instruction. Therefore, through the above technical solution, when a plurality of terminals in the same device network detect the same voice operation instruction, the server may determine the target terminal from the plurality of terminals to make responses, which may thereby ensure the uniqueness of performing the target operation when the voice operation instruction is detected by a plurality of terminals, and avoid the trouble to the user caused by the simultaneous execution of the same operation by a plurality of terminals. That is, it may not only avoid the waste of resources caused by the simultaneous execution of a plurality of terminals, but also meet the user's needs and improve user experience.

Alternatively, the method further includes:

sending a denial message to terminals among the plurality of terminals other than the target terminal, the denial message indicating that the terminals are to refuse to respond to the voice operation instruction.

In this embodiment, after the target terminal is determined from a plurality of terminals, in order to further ensure the uniqueness of the target operation execution, a denial message may be sent to other terminals, for replying to the denial message for the instruction execution requests of other terminals and notifying other terminals that there is no need to respond to the voice operation instruction.

Correspondingly, other terminals may ignore the voice operation instruction when receiving the denial message. That is, if the voice operation instruction is detected, the target operation corresponding to the voice operation instruction is not executed.

Therefore, through the above technical solution, the target operation corresponding to the voice instruction may be executed by the target terminal out of the plurality of terminals that have detected the same voice operation instruction. As illustrated in the example of FIG. 1, when the terminal A1 and the terminal A2 simultaneously detect the voice operation instruction of "what's the weather today", the terminals A1 and A2 may send their respective instruction execution requests to the server. When the server receives the instruction execution requests sent from the terminals A1 and A2, it determines the target terminal for responding to the voice operation instruction corresponding to the instruction execution requests according to the device information of the terminals A1 and A2. For example, the target terminal is determined as A2. At this time, the server sends a response message to the terminal A2, then the terminal A2 may execute the target operation when receiving the response message, i.e., may output a response, such as "Beijing today is sunny and the temperature is 15-30 degrees Celsius"; the server also sends a denial message to the terminal A1, then the terminal A1 will not output any response when the terminal A1 receives the denial message. This may ensure that only one terminal will output the response, thereby ensuring the uniqueness of operation execution when a plurality of terminals are activated and improving user experience. At the same time, sending the denial message to the terminal among the plurality of terminals other than the target terminal may also prevent other terminals from being in a waiting state for a long time, thereby improving the timeliness of message interaction.

Alternatively, in order to further improve the simplicity of the voice control method, the present disclosure also provides the following embodiment to waken the terminal.

Figure 4:
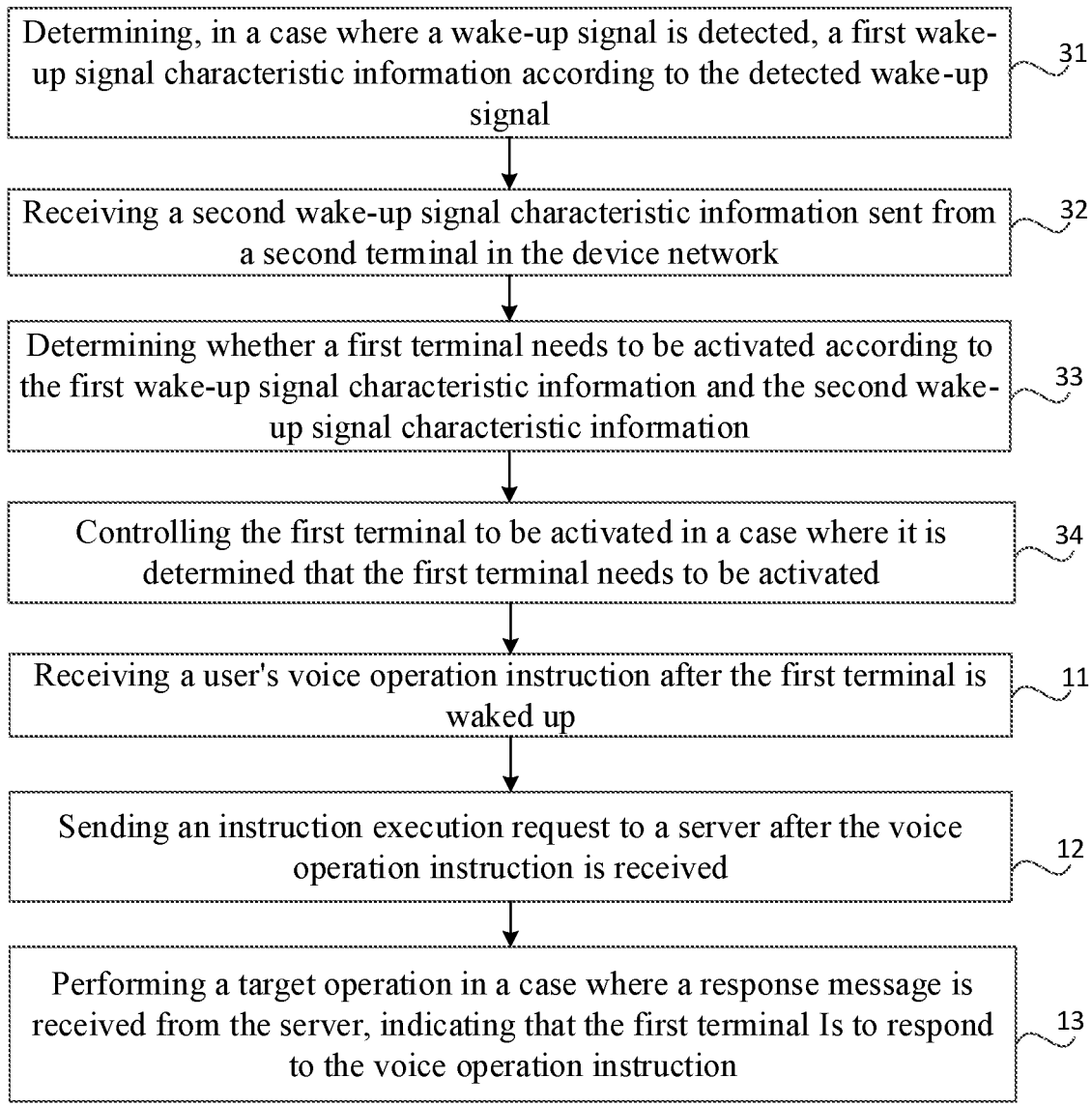
FIG. 4 is a flowchart of a voice control method illustrated according to some other embodiments.

When the method is applied to the first terminal, as illustrated in FIG. 4, the method may further include based on FIG. 2:

At step 31, when the wake-up signal is detected, a first wake-up signal characteristic information is determined according to the detected wake-up signal.

Alternatively, the wake-up signal characteristic information includes at least one of the following: a direction of sound source, a distance of sound source, a signal energy, and a matching degree between a wake-up signal and a wake-up word.

As an example, the wake-up signal detection may be executed by the voice detection apparatus in the device. For example, the wake-up signal from the user may be collected through a microphone array. The direction of sound source and distance of sound source may be determined according to the wake-up signal based on the method of existing sound location or range. The signal energy refers to the spectral energy corresponding to the wake-up signal, which may be obtained from the waveform data of the wake-up signal. The matching degree between the wake-up signal and the wake-up word is used to indicate a matching degree between a detected wake-up signal and a standard wake-up signal of the device. For example, the similarity between the waveforms of the detected wake-up signal and the standard wake-up signal may be determined as the matching degree between the wake-up signal and the wake-up word, and the greater the similarity, the higher the matching degree of the wake-up signal.

At step 32, a second wake-up signal characteristic information sent from a second terminal in the device network is received, wherein the second wake-up signal characteristic information is determined by the second terminal according to its detected wake-up signal. The second terminal is any one of the terminals other than the first terminal in the device network that detect the wake-up signal. The method for determining the second wake-up information characteristic information is the same as that described above, and will not be repeated again herein. After the terminal in the device network detects the wake-up signal and extracts its corresponding wake-up signal characteristic information, it may send the wake-up signal characteristic information to every other terminal in the device network, thereby realizing information sharing in the device network.

At step 33, it is determined whether the first terminal needs to be activated according to the first wake-up signal characteristic information and the second wake-up signal characteristic information.

For example, when there are a plurality of terminals with the same wake-up word in the current usage environment, the user usually only needs to waken one of them for use. Therefore, in this embodiment, the first terminal may obtain its own first wake-up signal characteristic information, and may also receive the second wake-up signal characteristic information from other terminals in the device network where it is located, so that the first terminal may determine whether it is necessary needs to be activated according to the information of the terminal in the device network, so that the number of terminals activated at the same time may be reduced with the wake-up word sent from the user to some extent.

At step 34, the first terminal is controlled to be activated in a case where it is determined that the first terminal needs to be activated.

For example, in a case where it is determined that the first terminal needs to be activated, controlling the first terminal to be activated may be to play a wake-up response for interacting with the user and notify the user that the first terminal is activated, which may be used to execute subsequent operations. Alternatively, in the case where it is determined that the first terminal needs to be activated, a wake-up notification message may be sent to the server for notifying the server that the terminal is activated.

Therefore, through the above technical solution, when a wake-up signal is detected by the current terminal, the terminal is not directly activated, but it is determined whether the current terminal needs to be activated according to the wake-up signal characteristic information corresponding to each terminal that detects the wake-up signal in the device network where the terminal is located, which may thereby avoid the problem of wakening a plurality of terminals at the same time to some extent, and effectively reduce the waste of resources caused by the terminal wait after wakening the terminal.

Alternatively, the second wake-up signal characteristic information sent from the second terminal in the device network is received during a first decision period, wherein the first decision period may be the period from the time when the first terminal detects the wake-up signal.

At step 33, an example implementation of determining whether the first terminal needs to be activated according to the first wake-up signal characteristic information and the second wake-up signal characteristic information may include:

determining whether the first terminal needs to be activated according to the first wake-up signal characteristic information and the second wake-up signal characteristic information received during the first decision period.

The times when a plurality of terminals located in the same device network detect the wake-up signal for the wake-up word sent from the user are similar with each other, so a period of time may be set for local decision to determine whether to waken the current terminal. For example, after the first decision period expires, as for a terminal that has no wake-up signal characteristic information in the device network, it may be considered that the wake-up word corresponding to the terminal is not a wake-up word sent from the user and such terminal may be directly ignored.

Therefore, through the above technical solutions, it is possible to ensure that relatively comprehensive wake-up signal characteristic information is received, thereby ensuring the accuracy of the wake-up decision, and it is also possible to ensure the timeliness of the wake-up decision, ensure the real-time wake-up response, and improve user experience.

It should be noted that, considering the delay of information transmission between the terminal and the server, the end time of a second decision period may be later than the end time of the first decision period corresponding to the terminal, so that it may be accurately determined that there are a plurality of wake-up terminals during the server decision period, thus the accuracy of the determined target terminal may be further ensured.

Alternatively, an example implementation of determining whether the first terminal needs to be activated according to the first wake-up signal characteristic information and the second wake-up signal characteristic information during the first decision period is described below, and this step may include:

determining a terminal wake-up parameter corresponding to the first terminal according to the first wake-up signal characteristic information;

determining each terminal wake-up parameter corresponding to the second terminal according to each second wake-up signal characteristic information respectively, wherein the terminal wake-up parameter is configured for characterizing a matching degree between the terminal and the wake-up signal;

Alternatively, the terminal wake-up parameter corresponding to the terminal is determined in the following manner:

If the wake-up signal characteristic information includes only one reference item (such as the data of distance of sound source), the normalized value of the reference item may be directly determined as the terminal wake-up parameter. If the wake-up characteristic signal characteristic information includes a plurality of parameter items, the plurality of parameter items may be respectively represented by vector, so that the terminal wake-up parameter is determined by performing a weighted sum of the plurality of parameter items. The wake-up signal characteristic information has been described in detail above, and will not be repeated again herein. The weight of each parameter item may be set according to actual usage scenarios, which is not limited in the present disclosure.

In a case where the best matching terminal corresponding to the terminal wake-up parameter is the first terminal, it is determined that the first terminal needs to be activated. In a case where the best matching terminal corresponding to the terminal wake-up parameter is not the first terminal, it is determined that the first terminal does not need to be activated. At this time, the current state of the first terminal is ensured to remain unchanged, which may effectively save the waste of resources resulting from the first terminal's wait after being activated. Through the above technical solution, each terminal may determine whether it needs to be activated locally according to its terminal information in the device network where it is located, so as to avoid the phenomenon of wakening a plurality of terminals at the same time to some extent and conform to user's usage requirement.

Alternatively, the method further includes:

sending the first wake-up signal characteristic information to the server, so that the server determines whether the first terminal responds to the voice operation instruction according to the first wake-up signal characteristic information and the device information of the terminal in the device network, after the instruction execution request is received. The server may start the timing of the second decision period after receiving the first wake-up signal characteristic information, which may enable the server to obtain more comprehensive reference information, and provide data support for improving the accuracy of the target terminal determined by the server.

Correspondingly, when the method is applied to a server, the method further includes:

receiving wake-up signal characteristic information sent from the plurality of terminals during the second decision period, where the wake-up signal characteristic information is determined by the terminal according to its detected wake-up signal. The manner in which the terminal determines its corresponding wake-up signal characteristic information has been described in detail above, and will not be repeated again herein.

At step 21, an example implementation of determining the target terminal for responding to the voice operation instruction corresponding to the instruction execution requests from a plurality of terminals according to device information of each terminal is described below, and this step may include:

determining priority information of each terminal according to the wake-up signal characteristic information sent from each terminal, wherein the terminal wake-up parameter corresponding to each terminal may be determined according to the wake-up signal characteristic information corresponding to each terminal, so as to determine the priority information of the terminal according to a matching degree characterized by the terminal wake-up parameter corresponding to each terminal, wherein the higher the matching degree of the terminal characterized by the terminal wake-up parameter, the higher the priority information of the terminal. The method of determining the terminal wake-up parameter corresponding to the terminal has been described in detail above, and will not be repeated again herein.

Then, the target terminal is determined according to the voice operation instruction, the priority information of each terminal, and the device information of each terminal.

A specific embodiment for determining the target terminal is described in detail below. For example, the device information includes device capability information, which is used to characterize the operations supported by the terminal.

For example, when the terminal is an alarm clock, its device capability information may include a time feedback capability for time telling or alarm setting, and may also include a weather feedback capability for telling weather information, etc.; when the terminal is a speaker, of which the device capability information may include time feedback capability, weather feedback capability, and audio playback capability for audio data playback. The device capability information of each first terminal may be preset.

An example implementation of determining the target terminal according to the voice operation instruction, the priority information of each terminal and the device information of each terminal is described below, and this step may include:

determining a terminal with the highest priority among the terminals whose device capability information match the target operation corresponding to the voice operation instruction as the target terminal.

As an example, the plurality of terminals are the terminals A1, A2, and A3, and the corresponding priority information determined is A2, A1, and A3 in descending order. In addition, the server may perform voice recognition according to the received voice operation instruction corresponding to the instruction execution requests, and determine the target operation corresponding to the voice operation instruction, so as to determine whether both the target operation and the device capability information are matched with each other. For example, the terminal A1 is a TV, A2 is a speaker, and A3 is an alarm clock, and the determined target operation is playing audio.

In a possible implementation manner, a candidate terminal may be selected according to the priority information in descending order, and it may be determined whether the device capability information of the candidate terminal matches the target operation. When it matches, the candidate terminal may be determined as the target terminal. For example, according to the order of priority information, the candidate terminal is first selected as the speaker A2. At this time, it is determined that the device capability information of the speaker A2 includes an audio playback capability, which matches the audio playback of the target operation. In this case, the speaker A2 may be directly determined as the target terminal while the remaining terminals do not need to match.

In another possible implementation, the candidate terminal corresponding to the target operation may be determined according to the device capability information of a plurality of terminal devices, and then the terminal with the highest priority information among the candidate terminals is determined as the target terminal. For example, the target operation is to play audio. Therefore, it may be determined whether the device capability information of a plurality of devices match the target operation, and thus it may be determined that the speaker A2 and the TV A1 may be used as candidate terminals. Wherein the priority of the speaker A2 is higher than the priority of the TV A1, and at this time, the speaker A2 may be determined as the target terminal.

Therefore, through the above technical solution, the target terminal that optimally responds to the voice operation instruction may be determined according to the voice operation instruction, the priority information of each terminal, and the device information of each terminal. In this way, it may ensure the execution matching degree of the target terminal and the voice operation instruction and conform to the user's usage requirements; it may also accurately and uniquely determine the target terminal so as to ensure that the target operation may be uniquely executed by the target terminal; it effectively prevents a plurality of terminals from executing the same operation at the same time when the plurality of terminals are activated and further improves the user experience.

Figure 5:
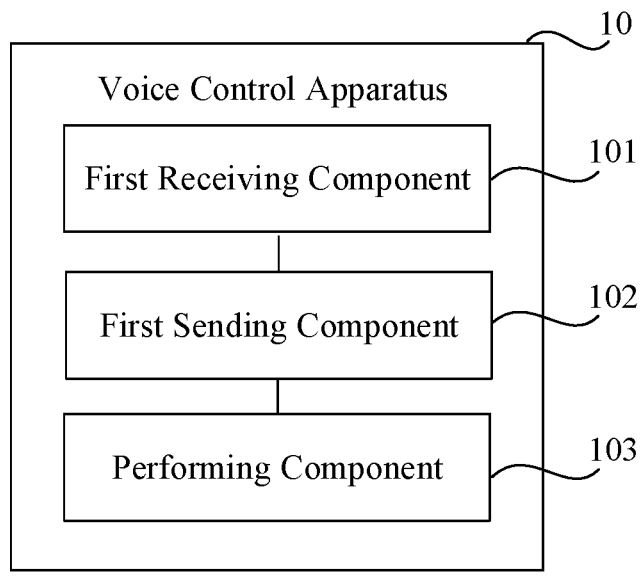
FIG. 5 is a block diagram of a voice control apparatus illustrated according to some embodiments.

Various embodiments of the present disclosure also provide a voice control apparatus, which is applied to the first terminal. As illustrated in FIG. 5, the apparatus 10 includes:

a first receiving component 101, configured to receive a user's voice operation instruction after the first terminal is activated, the voice operation instruction being used for controlling the first terminal to perform a target operation;

a first sending component 102, configured to send an instruction execution request to a server after the voice operation instruction is received, the instruction execution request being used for requesting the server to determine by the server whether the first terminal is to respond to the voice operation instruction according to device information of the terminal in a device network after the voice operation instruction is received, wherein the first terminal is located in the device network; and a performing component 103, configured to execute the target operation in a case where a response message for indicating that the first terminal responds to the voice operation instruction sent from the server is received.

Alternatively, the apparatus 10 further includes:

a first determining circuit, configured to determine a first wake-up signal characteristic information according to the detected wake-up signal in a case where a wake-up signal is detected;

a second receiving component, configured to receive a second wake-up signal characteristic information sent from a second terminal in the device network, wherein the second wake-up signal characteristic information is determined by the second terminal according to the wake-up signal detected by itself, and the second terminal is any one of the terminals other than the first terminal in the device network that detect the wake-up signal;

a second determining circuit, configured to determine whether the first terminal needs to be activated according to the first wake-up signal characteristic information and the second wake-up signal characteristic information;

a controlling module, configured to control the first terminal to be activated in a case where it is determined that the first terminal needs to be activated.

Alternatively, the second wake-up signal characteristic information sent from the second terminal in the device network is received during a first decision period;

the second determining circuit includes:

a first determining sub-module, configured to determine whether the first terminal needs to be activated according to the first wake-up signal characteristic information and the second wake-up signal characteristic information received during the first decision period.

Alternatively, the first determining sub-module includes:

a second determining sub-module, configured to determine a terminal wake-up parameter corresponding to the first terminal according to the first wake-up signal characteristic information;

a third determining sub-module, configured to determine each terminal wake-up parameter corresponding to the second terminal according to each second wake-up signal characteristic information, wherein the terminal wake-up parameter is configured for characterizing a matching degree between the terminal and the wake-up signal; and a fourth determining sub-module, configured to determine that the first terminal needs to be activated in a case where the best matching terminal corresponding to the terminal wake-up parameter is the first terminal.

Alternatively, the apparatus 10 further includes:

a second sending component, configured to send the first wake-up signal characteristic information to the server, so that the server determines whether the first terminal responds to the voice operation instruction according to the first wake-up signal characteristic information and the device information of the terminal in the device network, after the instruction execution request is received.

Alternatively, the wake-up signal characteristic information includes at least one of the following: a direction of sound source, a distance of sound source, a signal energy, and a matching degree between a wake-up signal and a wake-up word.

Figure 6:
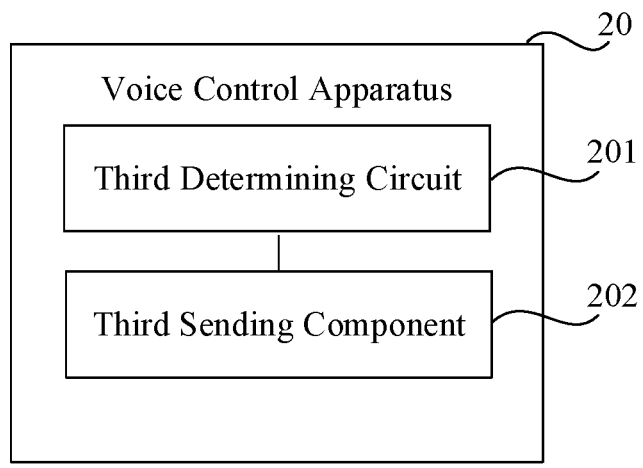
FIG. 6 is a block diagram of a voice control apparatus illustrated according to some other embodiments.

The present disclosure also provides a voice control apparatus applied to a server. As illustrated in FIG. 6, the apparatus 20 includes:

a third determining circuit 201, configured to determine a target terminal for responding to a voice operation instruction corresponding to instruction execution requests from a plurality of terminals according to device information of each terminal, in a case where the instruction execution requests sent from a plurality of terminals are received during a second decision period, wherein the plurality of terminals are located in the same device network, and the instruction execution requests sent from the plurality of terminals correspond to the same voice operation instruction; and a third sending component 202, configured to send a response message for indicating that the first terminal responds to the voice operation instruction to the target terminal, so that the target terminal executes the target operation corresponding to the voice operation instruction.

Alternatively, the apparatus 20 further includes:

a fourth sending component, configured to send a denial message for indicating the other terminals reject responses to the voice operation instruction, to other terminals among the plurality of terminals other than the target terminal.

Alternatively, the apparatus 20 further includes:

a third receiving component, configured to receive wake-up signal characteristic information sent from the plurality of terminals during the second decision period, wherein the wake-up signal characteristic information is determined by the terminal according to its detected wake-up signal;

the third determining circuit 201 includes:

a fifth determining sub-module, configured to determine priority information of each terminal according to the wake-up signal characteristic information sent from each terminal; and a sixth determining sub-module, configured to determine the target terminal according to the voice operation instruction, the priority information of each terminal and the device information of each terminal.

Alternatively, the device information includes device capability information for characterizing the operations supported by the terminal;

the sixth determining sub-module includes:

a seventh determining sub-module, configured to determine a terminal with the highest priority among the terminals whose device capability information match the target operation corresponding to the voice operation instruction as the target terminal.

Alternatively, the wake-up signal characteristic information includes at least one of the following: direction of sound source, distance of sound source, signal energy, and degree of matching between the wake-up signal and the wake-up word.

The specific implementations of executing the operation by each module in the apparatus of the foregoing embodiment have been described in detail in the embodiment of the method, and the detailed description thereof will not be repeated herein.

The present disclosure also provides a computer-readable storage medium on which computer program instructions are stored. When the program instructions are executed by a processor, the steps of the voice control method provided in the present disclosure are realized.

Figure 7:
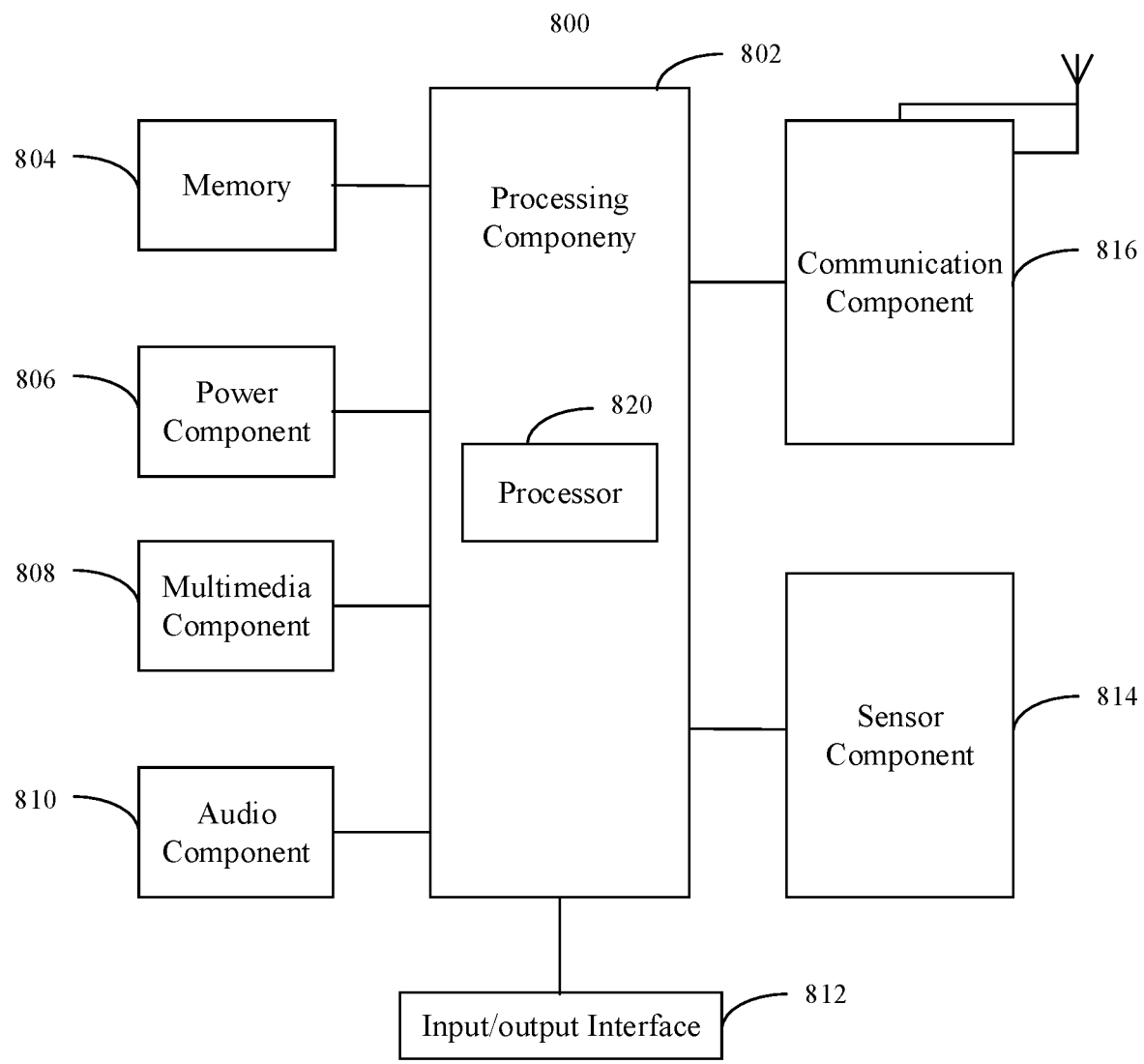
FIG. 7 is a block diagram of a voice control apparatus illustrated according to some other embodiments.

FIG. 7 is a block diagram of a voice control apparatus 800 illustrated according to some embodiments. For example, the apparatus 800 may be a mobile phone, a computer, a digital broadcasting terminal, a messaging device, a game console, a tablet device, a medical device, a fitness device, a personal digital assistant, etc.

Referring to FIG. 7, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the apparatus 800, such as the operations associated with display, telephone calls, data communications, camera operations, and recording operations. The processing component 802 may include one or more processors 820 to execute instructions to complete all or part of the steps of the aforementioned voice control method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations in the apparatus 800. Examples of these data include instructions for any application or method operating on the apparatus 800, contact data, phone book data, messages, pictures, videos, etc. The memory 804 may be implemented by any type of volatile or non-volatile storage device or their combination, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power component 806 provides power to various components of the apparatus 800. The power component 806 may include a power management system, one or more power supplies, and other components associated with generating, managing, and distributing power for the apparatus 800.

The multimedia component 808 includes a screen that provides an output interface between the apparatus 800 and the user. In some embodiments, the screen may include a liquid crystal display (LCD) and a touch panel (TP). In some embodiments, organic light-emitting diode (OLED) displays can be employed.

If the screen includes a touch panel, it may be implemented as a touch screen to receive input signals from the user. The touch panel includes one or more touch sensors to sense touching, sliding, and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the apparatus 800 is in an operation mode, such as a shooting mode or a video mode, the front camera and/or the rear camera may receive external multimedia data. Each front camera and rear camera may be a fixed optical lens system or have a focal length and optical zoom capabilities.

The audio component 810 is configured to output and/or input audio signals. For example, the audio component 810 includes a microphone (MIC). When the apparatus 800 is in an operating mode, such as a call mode, a recording mode, and a voice recognition mode, the microphone is configured to receive external audio signals. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, a button, and the like. These buttons may include but are not limited to: a home button, a volume button, a start button, and a lock button.

The sensor component 814 includes one or more sensors for providing the apparatus 800 with various aspects of status assessment. For example, the sensor component 814 may detect the open/close state of the apparatus 800 and the relative positioning of components. For example, the component is a display and a keypad of the apparatus 800. The sensor component 814 may also detect the position change of the apparatus 800 or a component thereof, the presence or absence of a contact between the user and the apparatus 800, the orientation or acceleration/deceleration of the apparatus 800, and temperature changes of the apparatus 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as WiFi, 2G, 3G, 4G, 5G or a combination thereof. In some embodiments, the communication component 816 receives a broadcast signal or broadcast related information from an external broadcast management system via a broadcast channel. In some embodiments, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some embodiments, the apparatus 800 may be implemented by one or more application specific integrated circuits (ASICs), digital signal processors (DSP), digital signal processing devices (DSPD), programmable logic devices (PLD), field programmable Implemented by a gate array (FPGA), controllers, microcontrollers, microprocessors, or other electronic components, which are configured to implement the above voice control method.

In some embodiments, there is also provided a non-transitory computer-readable storage medium including instructions, such as the memory 804 including instructions, which may be executed by the processor 820 of the apparatus 800 to complete the voice control method described above. For example, the non-transitory computer-readable storage medium may be a ROM, a random access memory (RAM), a CD-ROM, a magnetic tape, a floppy disk, an optical data storage device, etc.

In some other embodiments, a computer program product is further provided. The computer program product includes a computer program that may be executed by a programmable device, and the computer program has a code part for performing the above-mentioned voice control method when executed by the programmable device.

Figure 8:
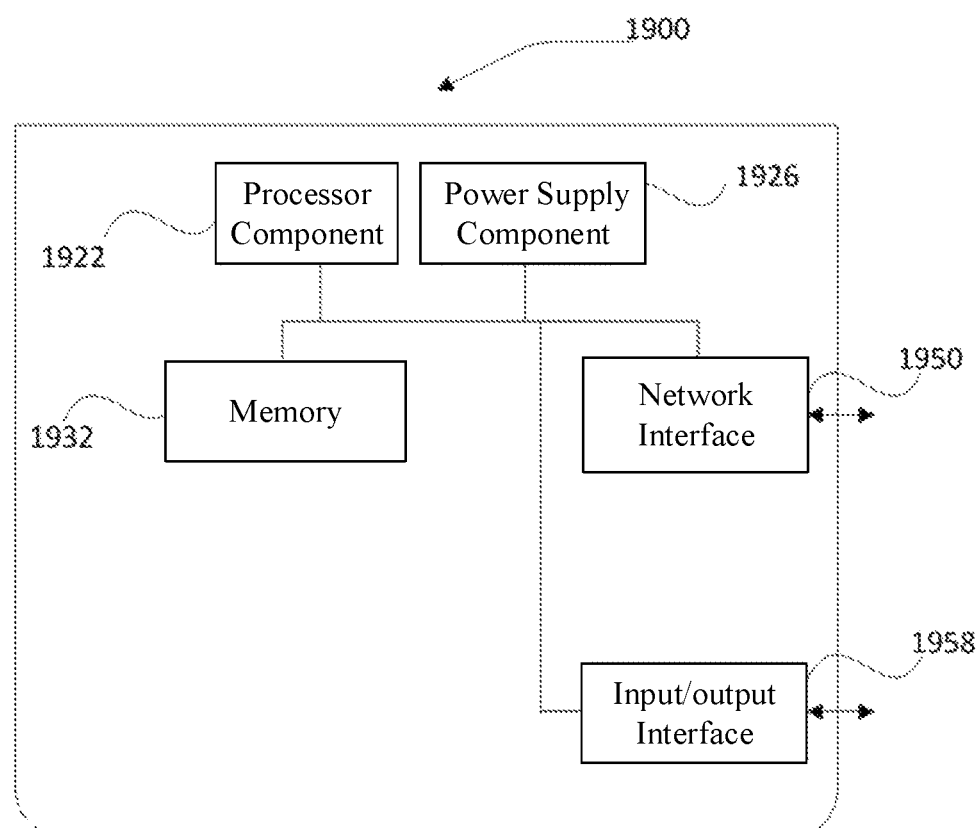
FIG. 8 is a block diagram of a voice control apparatus illustrated according to some other embodiments.

FIG. 8 is a block diagram of a voice control apparatus 1900 illustrated according to an exemplary embodiment. For example, the apparatus 1900 may be provided as a server. Referring to FIG. 8, the apparatus 1900 includes a processing component 1922, which further includes one or more processors, and a memory resource represented by a memory 1932 for storing instructions that may be executed by the processing component 1922, such as application programs. The application programs stored in the memory 1932 may include one or more modules each corresponding to a set of instructions. In addition, the processing component 1922 is configured to execute instructions to execute the aforementioned voice control method.

The apparatus 1900 may also include a power supply component 1926 configured to perform power management of the apparatus 1900, a wired or wireless network interface 1950 configured to connect the apparatus 1900 to a network, and an input output (I/O) interface 1958. The apparatus 1900 may operate an operating system stored in the memory 1932, such as Windows Server, Mac OS X™, Unix, Linux™ FreeBSD or the like.

Various embodiments of the present disclosure can have one or more of the following advantages.

After the first terminal is activated, a voice operation instruction from a user is received and an instruction execution request is sent to a server, so that the server determines whether the first terminal responds to the voice operation instruction according to the information of the terminal in a device network where the first terminal is located, and the target operation corresponding to the voice operation instruction is executed in a case where a response message for indicating that the first terminal responds to the voice operation instruction sent from the server is received. Thereby, through the above technical solution, the terminal after being activated and receiving the voice operation instruction does not directly respond to this voice operation instruction, but it is determined by the server whether the terminal should make responses, which may effectively avoid the problem that a plurality of terminals execute the same operation at the same time due to the terminal's direct responses to the voice operation instruction, and provide technical support to ensure the unique execution of the target operation. In addition, in the embodiment of the present disclosure, since the server decides whether the terminal should make responses to the received voice operation instruction, only the server may be upgraded when the voice control service is upgraded while each terminal is unaware, which reduces the overhead of the service version upgrade and broadens the usage scope of the voice control method.

The various circuits, device components, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

It will be understood that the "plurality" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," and "the" are also intended to include the plural forms unless the context clearly indicates otherwise.

It will be further understood that although the terms such as "first," "second," and the like are used to describe various information, this information should not be limited by these terms. The terms are only used to distinguish the same type of information from each other, and do not indicate a specific order or importance. In fact, the expressions such as "first," "second" and the like can be used interchangeably. For instance, first information can also be referred to as second information without departing from the scope of the disclosure, and similarly, the second information can also be referred to as the first information.

It will be further understood that although the operations in the embodiments of the present disclosure are described in a specific order in the drawings, it will not be understood as requiring that the operations are performed in the specific order shown or in a serial order, or that perform all the operations shown to acquire the desired result. In certain environments, multitasking and parallel processing may be advantageous.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

It is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A voice control method for a device network having multiple terminals including a first terminal, the method comprising:

in response to a wake-up signal being detected by each of the multiple terminals in the device network, determining wake-up signal characteristic information of the each of the multiple terminals;

in response to the wake-up signal characteristic information comprising one of items of a direction of sound source, a distance of sound source, a signal energy, and a matching degree between a wake-up signal and a wake-up word, determining a normalized value of the one of the items as a terminal wake-up parameter for each terminal, or in response to the wake-up signal characteristic information comprising multiple items of the direction of sound source, the distance of sound source, the signal energy, and the matching degree between the wake-up signal and the wake-up word, determining a weighted sum of the multiple items as the terminal wake-up parameter for each terminal;

receiving a voice operation instruction of a user after the first terminal is activated, the voice operation instruction being used for controlling the first terminal to perform a target operation;

sending an instruction execution request to a server after the voice operation instruction is received, the instruction execution request being used for requesting the server to determine whether the first terminal is to respond to the voice operation instruction according to device information of the multiple terminals in the device network;

performing the target operation in a case where a response message is received from the server, the response message indicating that the first terminal is to respond to the voice operation instruction;

and activating the first terminal in response to a value of the terminal wake-up parameter for the first terminal being highest.

2. The method of claim 1, further comprising:

determining, in a case where the wake-up signal is detected, a first wake-up signal characteristic information according to the detected wake-up signal;

receiving a second wake-up signal characteristic information sent from a second terminal in the device network, wherein the second wake-up signal characteristic information is determined by the second terminal according to the wake-up signal detected by itself, and the second terminal is any terminal that has detected the wake-up signal among the terminals in the device network other than the first terminal;

determining whether the first terminal needs to be activated according to the first wake-up signal characteristic information and the second wake-up signal characteristic information;

controlling the first terminal to be activated in a case where it is determined that the first terminal needs to be activated.

3. The method according to claim 2, wherein the second wake-up signal characteristic information sent from the second terminal in the device network is received during a first decision period, and the determining whether the first terminal needs to be activated according to the first wake-up signal characteristic information and the second wake-up signal characteristic information comprises:

determining whether the first terminal needs to be activated according to the first wake-up signal characteristic information and according to the second wake-up signal characteristic information received during the first decision period.

4. The method according to claim 3, wherein the determining whether the first terminal needs to be activated according to the first wake-up signal characteristic information and according to the second wake-up signal characteristic information received during the first decision period comprises:
  determining a first terminal wake-up parameter corresponding to the first terminal according to the first wake-up signal characteristic information;
  determining a second terminal wake-up parameter corresponding to each second terminal according to each second wake-up signal characteristic information respectively; and
  determining that the first terminal needs to be activated in a case where a terminal with the largest terminal wake-up parameter among the first terminal wake-up parameter and the second terminal wake-up parameters is the first terminal.

5. The method of claim 2, further comprising:
  sending the first wake-up signal characteristic information to the server, so that the server determines whether the first terminal is to respond to the voice operation instruction according to the first wake-up signal characteristic information and the device information of the terminal in the device network, after the instruction execution request is received.

6. A terminal implementing the method according to claim 1, wherein the terminal, after being activated and receiving the voice operation instruction, does not directly respond to the voice operation instruction.

7. A smart home system comprising the terminal according to claim 6, further comprising a plurality of terminals and the server.

8. The smart home system according to claim 7, wherein the server is configured to:
  determine, in a case where instruction execution requests sent from the plurality of terminals are received during a second decision period, a target terminal for responding to a voice operation instruction corresponding to the instruction execution requests among the plurality of terminals according to device information of each of the plurality of terminals, wherein the plurality of terminals are located in the same device network, and the instruction execution requests sent from the plurality of terminals correspond to the same voice operation instruction; and
  send a response message to the target terminal for indicating that the target terminal is to respond to the voice operation instruction, such that the target terminal performs a target operation corresponding to the voice operation instruction.

9. The smart home system according to claim 7, wherein the server is configured to determine whether the terminal should respond to the voice operation instruction, to thereby avoid that the plurality of terminals executing a same operation at a same time.

10. The smart home system according to claim 7, wherein only the server is configured to be upgraded when a voice control service is upgraded while each of the plurality of terminals is unaware of the voice control service, thereby reducing overhead of the voice control service upgrade.

11. A voice control method, which is applied to a server, comprising:
  in response to a wake-up signal being detected by each of multiple terminals in a device network, determining wake-up signal characteristic information of each of the multiple terminals,
  in response to the wake-up signal characteristic information comprising one of items of a direction of sound source, a distance of sound source, a signal energy, and a matching degree between a wake-up signal and a wake-up word, determining a normalized value of the one of the items as a terminal wake-up parameter for each terminal, or in response to the wake-up signal characteristic information comprising multiple items of the direction of sound source, the distance of sound source, the signal energy, and the matching degree between the wake-up signal and the wake-up word, determining a weighted sum of the multiple items as the terminal wake-up parameter for each terminal; and
  determining a first terminal to be activated in response to a value of the terminal wake-up parameter for the first terminal being highest;
  determining, in a case where instruction execution requests sent from a plurality of terminals are received during a second decision period, a target terminal for responding to a voice operation instruction corresponding to the instruction execution requests among the plurality of terminals according to device information of each of the plurality of terminals, wherein the plurality of terminals are located in a same device network, and the instruction execution requests sent from the plurality of terminals correspond to the voice operation instruction; and
  sending a response message to the target terminal for indicating that the target terminal is to respond to the voice operation instruction, so that the target terminal performs a target operation corresponding to the voice operation instruction;
  wherein determining the target terminal further comprises:
  determining priority information for each of the plurality of terminals according to the terminal wake-up parameter for each terminal; and
  determining the target terminal according to the voice operation instruction, the priority information for each of the plurality of terminals, and the device information for each of the plurality of terminals.

12. The method according to claim 11, further comprising:
  sending a denial message to terminals among the plurality of terminals other than the target terminal, the denial message indicating that the terminals are to refuse to respond to the voice operation instruction.

13. The method according to claim 11, further comprising:
  receiving wake-up signal characteristic information sent from the plurality of terminals during the second decision period.

14. The method according to claim 13, wherein the device information comprises device capability information for characterizing operations supported by the terminal, and
  the determining the target terminal according to the voice operation instruction, the priority information for each of the terminals, and the device information for each of the terminals comprises:
  determining a terminal having the highest priority among the terminals with the device capability information matching with the target operation corresponding to the voice operation instruction, as the target terminal.

15. A voice control apparatus, comprising:
a first determining circuit configured to:
  in response to a wake-up signal being detected by each of multiple terminals in a device network, determine wake-up signal characteristic information of each of the multiple terminals;

in response to the wake-up signal characteristic information comprising one of items of a direction of sound source, a distance of sound source, a signal energy, and a matching degree between a wake-up signal and a wake-up word, determine a normalized value of the one of the items as a terminal wake-up parameter for each terminal, or in response to the wake-up signal characteristic information comprising multiple items of the direction of sound source, the distance of sound source, the signal energy, and the matching degree between the wake-up signal and the wake-up word, determine a weighted sum of the multiple items as the terminal wake-up parameter for each of the multiple terminals; and determine a first terminal to be activated in response to a value of the terminal wake-up parameter for the first terminal being highest;

a first receiving component, configured to receive a voice operation instruction of a user after the first terminal is activated, the voice operation instruction being used for controlling the first terminal to perform a target operation;

a first sending component, configured to send an instruction execution request to a server after the voice operation instruction is received, the instruction execution request being used for requesting the server to determine whether the first terminal is to respond to the voice operation instruction according to device information of the terminal in a device network, wherein the first terminal is located in the device network;

a performing component, configured to perform the target operation in a case where a response message is received from the server, the response message indicating that the first terminal is to respond to the voice operation instruction;

a second determining circuit, configured to determine, in a case where instruction execution requests sent from a plurality of terminals are received during a decision period, a target terminal for responding to a voice operation instruction corresponding to the instruction execution requests among the plurality of terminals according to device information of each of the plurality of terminals, wherein the plurality of terminals are located in the device network, and the instruction execution requests sent from the plurality of terminals correspond to a same voice operation instruction; and a second sending component, configured to send a response message to the target terminal for indicating that the target terminal is to respond to the voice operation instruction, so that the target terminal performs a target operation corresponding to the voice operation instruction.

* * * * *